United States Patent

[11] 3,573,623

[72] Inventors John Michael Bannon
Baltimore;
Joseph Carroll Kvarda, Silver Spring, Md.
[21] Appl. No. 770,169
[22] Filed Oct. 24, 1968
[45] Patented Apr. 6, 1971
[73] Assignee The Bunker-Ramo Corporation
Stamford, Conn.

[54] TRANSVERSAL FILTER
20 Claims, 4 Drawing Figs.

[52] U.S. Cl. .......... 325/42, 333/18, 333/70, 235/150.5
[51] Int. Cl. .......... H04b 3/04
[50] Field of Search .......... 235/181, 152, 150.5; 333/18, 28, 70 (T); 325/42, 65; 178/5, 69; 340/149

[56] References Cited

UNITED STATES PATENTS

| | | | |
|---|---|---|---|
| 3,303,335 | 2/1967 | Pryor | 235/152 |
| 3,314,015 | 4/1967 | Simone | 325/42 |
| 3,430,145 | 2/1969 | Lord | 325/42 |
| 3,431,405 | 3/1969 | Dawson | 235/181 |
| 3,445,771 | 5/1969 | Clapham | 325/42 |
| 3,479,458 | 11/1969 | Lord et al. | 325/42 |
| 3,489,848 | 1/1970 | Perreault | 178/5 |
| 3,444,468 | 5/1969 | Drouilhet, Jr. et al. | 333/18 |

*Primary Examiner*—Gareth D. Shaw
*Attorney*—Frederick M. Arbuckle

ABSTRACT: A transversal filter which includes means for encoding an analogue value of an applied synchronous input signal into a binary pulse train. The binary pulse train is applied through a delay line which has taps spaced at discrete intervals. The outputs from at least selected ones of the taps are utilized to gate predetermined values stored in associated storage means to the inputs of a summing means. The output from the summing means is utilized as the transversal filter output.

The transversal filter described above may be utilized as part of an automatic line equalizer by initially applying known test signals to the filter and utilizing the error signals generated by comparing the outputs from the filter against a desired reference to adjust the predetermined values stored in the storage means. When these values have been set such as to provide an output which differs from the reference within predetermined limits, the equalizer is ready to operate on information inputs.

Patented April 6, 1971 3,573,623

3 Sheets-Sheet 1

INVENTOR.
JOHN MICHAEL BANNON
JOSEPH CARROLL KVARDA
BY Ronald J. Kransdorf

TRANSVERSAL FILTER

TRANSVERSAL FILTERS

This invention relates to transversal filters and in particular to automatic equalizers utilizing such filters.

For a communications channel required to pass information which is band-limited to be capable of reproducing at its output a true representation of the signal applied to its input, the channel must, over the frequency range of the information which it will be required to pass, (1) have a flat amplitude frequency response and (2) have a uniform delay through the channel. Any deviation from a flat amplitude-frequency characteristic or from a linear phase-frequency characteristic within the channel causes the transmitted signal to become distorted from transmission. In the case of a digital data transmission, this distortion results in an increase of intersymbol interference. If communication with a low error probability is to take place in such an environment, the data rate must be reduced to a level below that which is possible in the absence of such distortion. Reducing the distortion therefore results in a net improvement in channel utilization.

One method which has heretofore been used to compensate for distortion within a channel has been to pass the output from the channel through the delay line of a transversal filter. Since a tapped delay line represents a mathematical model of the channel, samples of the signal taken with the taps set at predetermined intervals may be weighted in a manner such as to compensate for the distortion and then summed. The original signal may then be reconstructed from the sum of the weighted tap outputs.

The standard transversal filter used in such applications employs a tapped analogue delay line together with analogue multipliers. These devices are expensive and cumbersome, particularly when used with a channel having a varying data rate. Under such conditions it is desirable that both the delay line tap spacing and the total length of the line be capable of being changed in order to achieve the desired distortion compensation. With an analogue delay line such variations can be accomplished only by an expensive and time-consuming physical change in the circuit such as by rewiring or the like. Another disadvantage of these prior art systems is that the multipliers used for the weighting operation in general must accept bipolar signals and be capable of multiplying these signals by bipolar weights. The resulting four quadrant analogue multiplier is a complex and extremely expensive device. Another possible approach to the design of a transversal filter for channel equalization involves a fully digital implementation of the basic analogue technique. This approach results in an extremely complex device approaching the complexity of a small, special purpose digital computer. In addition, it suffers from the problem of having to perform internal functions at high processing speeds because of the use of a single time-shared digital multiplier to perform the weighting operation. A device of this type is difficult to implement and is quite expensive.

From the above it is apparent that in order for the transversal filter to be utilized extensively as an equalizer a less expensive and more versatile filter which is adapted for use in these applications is required. Such a filter should permit tap spacing and delay line length to be readily varied and it should also permit the use of relatively simple and low cost components. Such an improved filter might be used for distortion correction in any form of synchronous information propagation and could also be used in other transversal filter applications such as automatic network synthesis, low frequency digital filtering, controlled distortion generation, low frequency spectrum analysis and propagation simulation.

It is therefore a prime object of this invention to provide an improved transversal filter.

A more specific object of this invention is to provide a transversal filter which is less expensive to build than existing devices.

A further object of this invention is to provide a transversal filter which is versatile in that its delay line tap spacing and length may be easily varied.

A still more specific object of this invention is to provide an automatic equalizer utilizing an improved transversal filter as the principal element thereof.

A further object of this invention is to provide an automatic equalizer which may easily function with channels having varying data rates without requiring any physical changes in the device.

A still further object of this invention is to provide a high performance automatic equalizer which may be easily and inexpensively implemented.

The foregoing and other objects, features and advantages of the invention will be apparent from the following more particular description of a preferred embodiment of the invention, as illustrated in the accompanying drawings.

FIG. 1 is a diagram illustrating how FIGS. 1A—1B are to be combined to form a schematic block diagram of a preferred embodiment of the invention.

FIGS. 1A—1B, when combined form a schematic block diagram of a preferred embodiment of the invention.

GENERAL DESCRIPTION

Figure 1A:
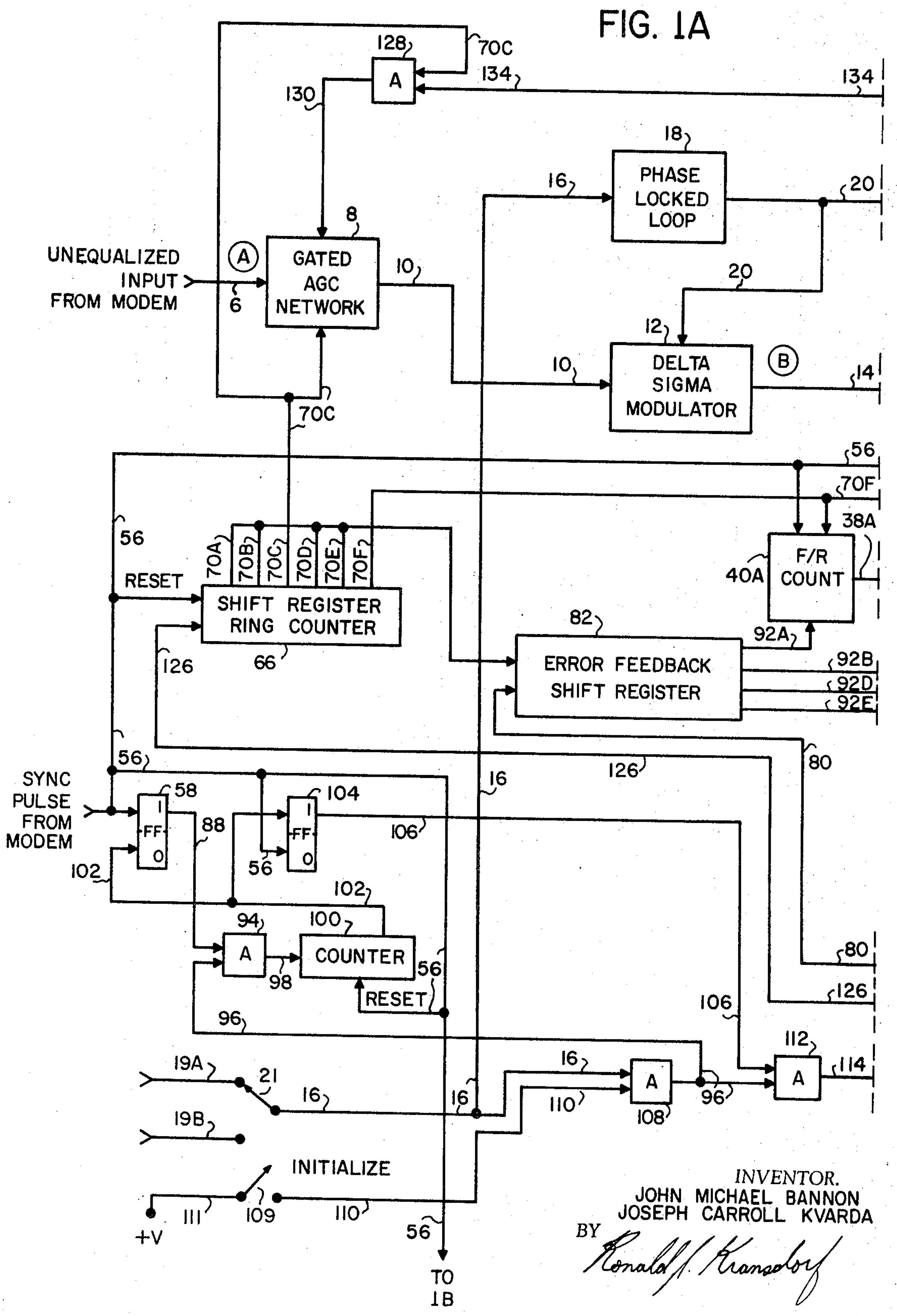

The general approach of this invention is to convert the input signal into a binary pulse train in a device which is, for the preferred embodiment of the invention, a delta-sigma modulator. The output from a delta-sigma modulator is a pulse train the density of which is proportional to the amplitude of the applied input. This pulse train is applied to a delay line which, for the preferred embodiment of the invention, is a multipositioned shift register. Taps are provided at predetermined positions along the length of the shift register delay line and the outputs from these taps are utilized as the control inputs to a series of gates. The information input to each of these gates is the output from a forward-reverse counter which has a weighting value stored therein. The weighted outputs from the gates are summed in a summing circuit and passed to a low pass filter to reconstruct the desired output signal. The conversion of the input into a binary pulse train permits the multiplications required for the weighting operation to be performed by simple gates or switches rather than by multipliers while the use of shift registers in place of an analogue delay line permits tap spacing and line length to be easily varied merely by varying the delay line clock.

The weights stored in the forward-reverse counters are derived by transmitting a test pulse through the channel over which communication is desired and comparing, at the receiving end, the distorted test pulse to a desired reference. An error signal is generated as a result of this comparison and is utilized to control the altering of the weights in the forward-reverse counters so as to tend to eliminate the distortion found in the test pulse. This procedure is repeated until, after compensation in the transversal filter, the received test pulse conforms, within the limits of practicality, to a desired waveform.

DETAILED DESCRIPTION

Referring now to FIG. 1 it is seen that an unequalized input signal on line 6 from, for example, a modem (not shown) is applied through gated AGC network 8 and line 10 to the input of delta-sigma modulator 12. The input to the modem may, for example, be a telephone line. An unequalized input signal of the type which may appear on line 6 is shown on line A of FIG. 2. From this FIG. it can be seen that the received signal has a finite amplitude during both the data clock intervals prior to that at which it appears and at the data clock intervals subsequent to that at which it appears. While it is extremely difficult to eliminate all distortion in the input signal, the equalizer should reduce and redistribute distortion in a manner such that there will be zero signal amplitude at all clock intervals except that at which the data pulse is to appear. Such a reduction in distortion would significantly improve the obtainable data rate through the channel.

AGC circuit 8, which may be of a standard type, is required in order to compensate for and control, the inherent gain of the equalizer. The operation of this circuit will be described later.

Figure 2:
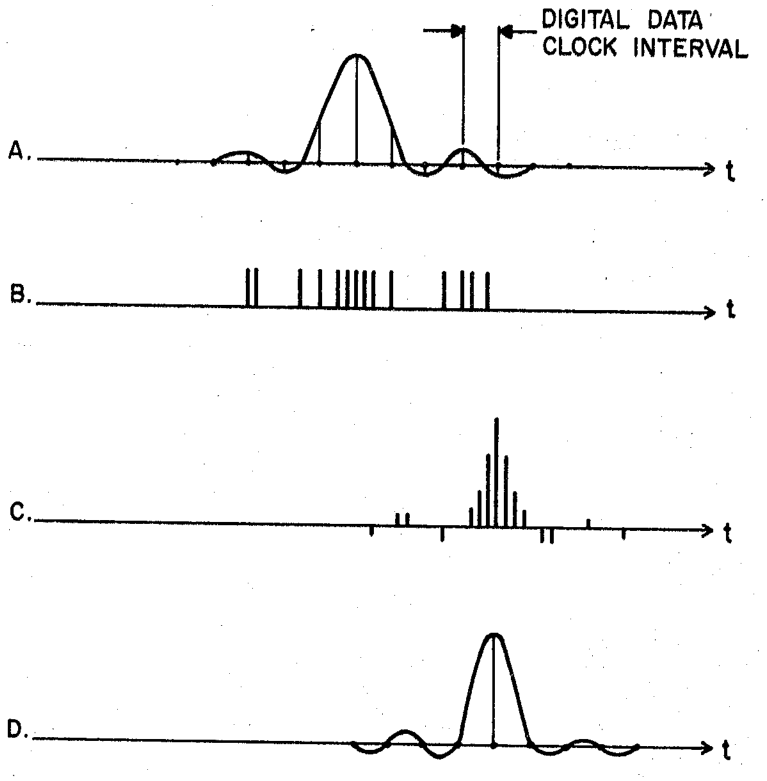
FIG. 2 is a diagram showing illustrative waveforms which may appear at various points in the circuit of FIG. 1.

Delta-sigma modulator 12 converts the input signal into a pulse train, the pulse density of which is proportional to the amplitude of the applied input. Line B of FIG. 2 is a representation of the output appearing on line 14 from the modulator. This representation is not drawn to scale, the actual modulator clock rate being much faster than could be indicated in the FIG. In order to get an idea of what this clock rate difference may be, assume that a signal to noise ratio of 40 db. is required from the modulator. This is a representative number since 30 db. is a typical telephone channel signal to noise ratio. It may be shown theoretically that for a 40 db. signal to noise ratio a sample frequency for the modulator which is approximately 32 times the signal frequency is required. Thus, data clock line 16 from the modem is connected as the input to the phase-locked loop 18. The phase-locked loop, which may be a standard circuit of this type, generates an output signal on line 20 which is at an integral multiple of the input frequency. The output signal has a specified phase relationship to the signal on line 16. Output line 20 from phase-locked loop 18 is used as the clock input for modulator 12 and the shift register delay line 32. For the example indicated above, the multiplication ratio in the phase-locked loop 18 would be 32 to 1. If a lower signal to noise ratio may be tolerated, a lower multiplication factor could be employed. Clock line 16 is fed from one of two clock lines, 19A or 19B, depending on the position of switch 21. A different clock signal is applied to each of the lines 19, the rates on these clock signals corresponding to the possible clock rates which may be utilized on the input line 6. The signals applied to lines 19 may be derived from different modems or switch 21 may be within the modem. For the discussion to follow, assume that switch 21 is positioned as shown to connect line 19A to data clock line 16.

Figure 3:
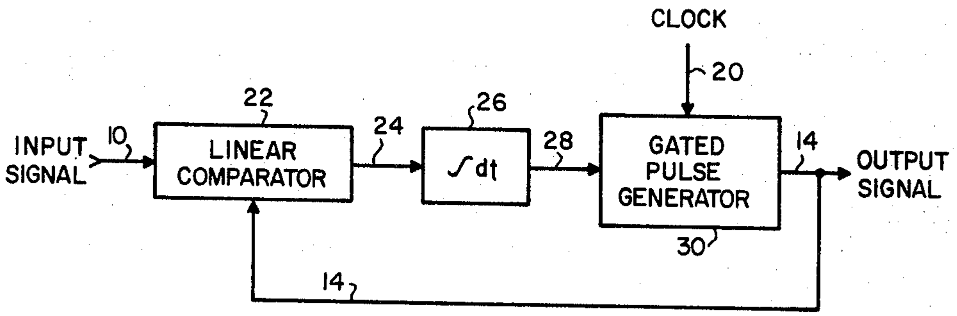
FIG. 3 is a schematic block diagram of a delta-sigma modulator suitable for use in the circuit shown in FIG. 1.

FIG. 3 is a circuit diagram of a delta-sigma modulator suitable for use in the preferred embodiment of the invention. The input signal on line 10 is applied as one input to the linear comparator 22, the other input to this linear comparator being modulator output line 14. The output from the linear comparator 22 is applied through line 24 to integrator 26. Output line 28 from integrator 26 is applied as one input to gated pulse generator 30, the other input to this generator being clock line 20. A pulse appears on output line 14 if the voltage level on line 28 is greater than 0 when a clock appears on line 20. If the level on line 28 is less than 0 when a clock appears on line 20 no pulse is generated on line 14.

The pulses on output line 14 from modulator 12 are serially shifted into shift register delay line 32. The clock input to register 32 is clock line 20. The 1 bit or 0 bit is shifted into delay line 32 as each clock pulse appears on line 20 under control of the pulses on line 14. Delay line 32 has a plurality of evenly spaced taps 34. For purposes of illustration five such taps 34A—34E have been shown in FIG. 1. The separation between taps should be equal to the reciprocal of the data clock rate.

With this as the tap spacing, the number of shift register spaces required between taps would be equal to the multiplication ratio in the phase-locked loop 18. Although this requires a large number of flip-flop register stages in delay line 32, such a register can be constructed, using modern integrated circuit technology, in a small package at nominal cost. It should be noted that relatively few output leads are required in the shift register comparator to the number of flip-flops, thus further simplifying the construction. The number of taps which are employed on delay line 32, and thus the total length of the line will depend on a number of factors including the initial channel distortion and the desired value of residual distortion. As the echoes generated by the distortion become more dispersed in time, the delay line must have a longer overall length to equalize the channel to a given residual distortion. Requiring that the residual distortion be reduced to 0 will generally require an infinitely long delay line. It is, however, possible to make the distortion as small as one pleases by making the delay line sufficiently long. Relating the residual distortion to the initial distortion as a function of the number of taps is a complex analytical problem requiring the solution of $N$ equations in $N$ unknowns assuming $N+1$ delay line taps. The solution of this problem is discussed in an article entitled "Automatic Equalization for Digital Communication" which appeared in the Bell System Technical Journal, volume 44, pages 547—588, Apr. 19, 1965.

Each of the taps 34, with the exception of tap 34C, is connected as the switching input to a corresponding gate 36. Gates 36 function as analogue switches, the information inputs to which are output lines 38 from corresponding forward-reverse counters 40. Thus, when a 1 bit is in the shift register position corresponding to a tap 34, the corresponding gate 36 is conditioned to pass the count stored in the corresponding counter 40 through the corresponding lines 42 to the summing circuit 44. When there is a 0 bit in the shift register stage corresponding to a tap, there is no input to summing circuit 44 on the corresponding line 42. Thus, the amplitude of the signal appearing on output line 46 from summing circuit 44 at any given time is equal to the sum of the weighted outputs from the taps 34 with the output of the center tap 34C always being given a weight of unity. An amplifier or a trigger 35 may be required between line 34C and line 42C in order to achieve the desired unity signal level. The desired weighting for distortion compensation is achieved by adjusting the weights in counters 40 so as to minimize distortion within the delay line length capability.

The signal on line 46 is applied to low pass filter 52. A typical signal which may appear on line 46 is shown on line C of FIG. 2. The samples appearing on line 46 are smoothed in filter 52 to give the desired equalized output signal on circuit output line 54. A typical signal which may appear on output line 54 for the input signal shown on line A of FIG. 2 is shown on line D of FIG. 2. It is noted that this signal has almost zero amplitude at all data clock times except the data clock time corresponding to its appropriate bit time. The possibility of intersymbol interference is thus significantly reduced making possible higher bit densities on the line.

In order to achieve equalization in the circuit shown in FIG. 1, proper weighting values must be stored in the forward-reverse counters 40. In the circuit of FIG. 1, the first step in this operation is to close initialized switch 109 so as to apply a positive voltage to line 110. Switch 109 may either be a manual switch on the modem which may be operated by the person using the equalizer or may be a remote control switch operated in response to a signal from the transmitter. Either before or after switch 109 is closed, the data clock used to generate signals on line 16, which clock is part of the modem receiver, is synchronized with the data clock at the transmitter. This latter step may be accomplished by standard techniques which do not form part of the present invention.

When the above steps have been accomplished, a sync pulse is generated at the transmitter. The detection of this pulse by the modem results in a sync signal appearing on line 56. This signal on line 56 is applied to set flip-flop 58 to its 1 state, to reset flip-flops 104 and 120 to their 0 state, to reset counters 100 and 122 to a count of 0, to reset counter 66 so that a bit appears in its leftmost position (i.e. the position prior to that which generates an output on line 70A), and to reset all of the forward-reverse counters 40 to a count (weight) of 0. The positive voltage level on line 110 is applied to condition AND gate 108 to pass clock pulses on line 16 to line 96. When flip-flop 58 is set to its 1 state by the sync pulse, a signal appears on 1-side output line 88 which signal conditions AND gate 94 to pass the clock pulses on line 96 through line 98 to increment counter 100. Therefore, as each clock pulse is applied to line 16, the count in counter 100 is incremented until the count reaches a point such that an output appears on line 102. The signal on line 102 is applied to set flip-flop 104 to its 1 state. The function of counter 100 is to delay the start of the equalization operation until a test pulse is received. The delay between the reset signal on line 56 and the signal on line 102 is thus equal to the time between the sync pulse and the first test pulse. The signal on line 102 is also applied to reset flip-flop 58 to its 0 state thus inhibiting further incrementing of counter 100.

Flip-flop 104 (FIG. 1A) being set to its 1 state results in a signal on 1-side output line 106 which signal is applied to condition AND gate 112 to pass the clock pulse on line 96 through AND gate 112 to line 114. The clock pulses on line 114 are applied to increment counter 122 and are also applied as one input to AND gate 116. Since flip-flop 120 was reset to its 0 state, there is a signal on 0-side output line 118 from this flip-flop which signal conditions AND gate 116 to pass the clock pulses on line 114 to line 126. The signal on line 126 increments ring counter 66 to apply an output an output to line 70A. It is also applied as a conditioning input to AND gate 78. At the time that the first signal appears on line 126, the test pulse is adjacent to tap 34A in delay line 32. The output on line 54 at this time is applied as one input to differential comparator 74. The other input to comparator 74 is a DC level on line 72 which is set at the binary 0 level. Since it is desired that the circuit generate a 0 output at this time, any output from comparator 74 on line 76 at this time is an error signal. This error signal may either be positive or negative. The signal on line 76 will depend only on the polarity of the error, not on its magnitude. The signal on line 76 is gated through AND gate 78 by the signal on line 126 and through line 80 to be stored in the position in error feedback shift register 82 adjacent to line 92E. This storage is performed under control of the signal on line 70A.

When the next clock pulse appears on line 16, the test pulse has advanced in shift register 32 to a position adjacent to tap 34B. At this time a signal again appears on line 126 incrementing counters 122 and 66 and conditioning gate 78 to pass the error signal from comparator 75 to be stored in shift register 82. The new error signal is stored in the position adjacent to line 92E with the previously stored value being shifted to the position adjacent to line 92D.

When the next clock pulse appears on line 16, the test pulse is adjacent to tap 34C. At this time an output is desired on line 54. However, since there is no forward-reverse counter for tap 34C, there is no need to store an error signal in shift register 82. Instead, the signal on line 54 is applied as one input to differential comparator 132, the other input to this comparator being a binary 1 level signal on line 136. Any error output from comparator 132 on line 134 is applied through AND gate 128, which gate is conditioned by the signal on line 70C at this time, to line 130. The signal on line 130, in conjunction with the signal on line 70C, causes an adjustment in the gain of AGC circuit 8. The increases or decreases in gain in circuit 8 are made in incremental steps.

As the test pulse advances to positions adjacent to taps 34D and 34E, the resulting error polarities are stored in shift register 82 in a manner previously described. At the end of these operations, the error polarity which was first entered into shift register 82 is adjacent to line 92A with the succeedingly received error signals being adjacent to lines 92B, 92D, and 92E respectively. The next clock pulse on line 126 causes ring counter 66 to be incremented to generate an output signal on line 70F. The signal on line 70F, in conjunction with the signals on line 92A—92E, cause the values in the forward-reverse counters 40 to either be incremented or decremented by one count depending on whether the corresponding stored error polarity is negative or positive respectively. At the same time that a signal appears on line 70F, a signal also appears on output line 124A from counter 122. The signal on line 124A is applied to reset flip-flop 120 to its 1 state, thus deconditioning AND gate 116 and inhibiting the storage of any additional information in shift register 82.

Since flip-flop 104 is still in its 1 state, AND gate 112 is still conditioned to apply clock pulses to counter 122. When counter 122 is stepped to its last position, a signal appears on output line 124B which signal is applied through OR gate 57 and line 59 to reset flip-flop 120 to its 0 state. The time lag between the signal on line 124A and the signal on line 124B is equal to the time difference between the shifting out of a test pulse from delay line shift register 32 and the receipt of a new test pulse at the shift register. The resetting of flip-flop 120 to its 0 state results in a signal appearing on line 118 reconditioning AND gate 116 to pass clock pulses to line 126. This results in error polarity information again being stored in shift register 82 and in AGC circuit 8 and forward-reverse counter 40 being adjusted in a manner described above.

This sequence of operation is repeated for succeeding test pulses until a distortion-measuring apparatus indicates that distortion has been reduced to within a predetermined tolerance level, or until a predetermined number of test pulses have been received, or until some other criteria is satisfied. At this time switch 109 is opened, either automatically or under manual control. Switch 109 being opened deconditions AND gate 108 preventing further data clocks from being applied to counter 66 and AND gate 78. The counts in forward-reverse counters 40 are thus maintained at their existing level and the circuit is ready to equalize incoming information signals.

The technique described above for adjusting the weights in the forward-reverse counters is based on a technique suggested by R.W. Lucky in the before-mentioned article entitled "Automatic Equalization for Digital Communication" which appeared in the Bell System Technical Journal, volume 44, Apr. 19, 1965, pages 547—588. With this technique the error signal is formed by sampling only the error polarity at the points $\pm nT$ with respect to $t_o$ where $t_o$ is the bit time when the test pulse in the delay line is at the center tap 34C and $T$ is the sampling interval and also the time interval between taps on delay line 32. After each test pulse, the $n$th forward-reverse counter weight is either incremented or decremented one step depending on whether the error at $t=t_o-nT$ was either negative or positive respectively, and where $-N<n<+N$, there being $2N+1$ delay line taps. Mr. Lucky has shown that this procedure converges to a minimum of distortion within the capabilities of the delay line length provided that the initial distortion was less than unity. Mr. Lucky in the above reference article also shows that the distortion $D_0$ at the input, line 6, which distortion may be defined by the following equation:

$$D_o=\frac{\sum_{n=-\infty}^{\infty}|y(to-nT)|}{|y(to)|}$$

is a convex function. A convex function is defined to be one which possesses no relative maxima or minima. Hence, once the minimum of a convex function has been found, one is assured that the minimum is a true minimum. Thus, the procedure outlined above will provide weight values which will yield the minimum possible distortion for a given delay line length on equalizer output line 54, provided an adequate number of test pulses are supplied and provided the initial distortion is less than unity. If greater equalization is required, a greater number of taps must be provided on delay line 32.

Figure 1B:
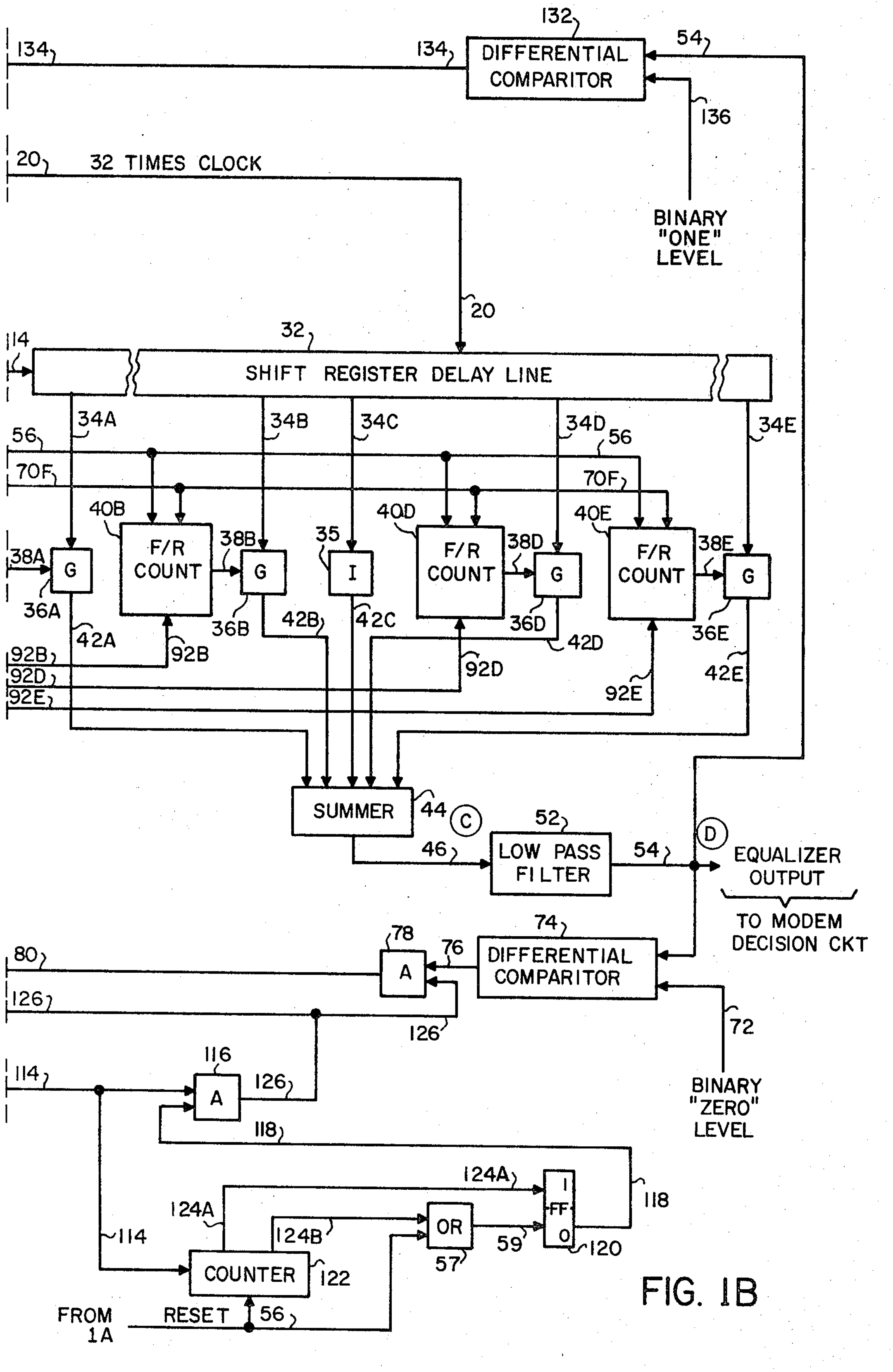

Assume now that after equalizing one type of channel, it is desired to apply the circuit shown in FIGS. 1A—1B to a second channel which is known to possess only half the original channel bandwidth. Thus, even when completely equalized, the data rate obtainable in the second channel will only be one-half that of the first (assuming equal signal to noise ratio and identical modulation method). Under such conditions it would be advantageous to double the tap spacing of the line. To accomplish this with an analogue delay line would require a physical change. However, this can easily be accomplished with a shift register delay line, such as delay line 32, by merely halving the clock rate on line 16 and thus also on line 20. This may, for example, be accomplished by transferring switch 21 (FIG. 1A) from the position shown to its alternate position, thereby connecting line 19B to data clock line 16. Line 19B would be connected to a clock operating at one-half the rate of the clock connected to line 19A or could be the same line from a modem operating at half the former speed. If it should also turn out that the second channel had half the delay bandwidth, the total length of the delay line should be twice the time length of the delay line used for the original channel. The reason for this is that the echoes will be dispersed twice as far in time. This requires the same number of flip-flops in the shift register delay line as was required for the original channel since the clock rate has been halved. Thus, the use of a digital shift register in place of an analogue delay line in an automatic equalizer utilizing transversal filtering provides a far more versatile circuit which can accommodate channels of varying channel and delay bandwidth. However, in applications where the equalizer is to be utilized with a single channel having fixed characters, an analogue delay line could still be utilized while practicing some of the principles of this invention.

In order to use a digital shift register in place of an analogue delay line, and more important, in order to be able to substitute gating circuits 36 for complex multipliers, the analogue input pulses must be converted into a binary pulse train. In the preferred embodiment of the invention this has been accomplished by use of delta-sigma modulator 12. While this is the preferred element, any element capable of converting an analogue value of the input pulses into a binary pulse train may be utilized in its place. Another example of such a circuit is a delta modulator which generates an output pulse train the density of which is proportional to the slope of the input signal.

Also, while in the preferred embodiment of the invention, test pulses have initially been applied to the equalizer to permit weights to be set into forward-reverse counters 40 before data is applied to the line, it is possible to operate the circuit in an adaptive mode whereby the test pulses are interspersed with data and weights adjusted as the line is in use. This requires some circuitry for distinguishing between data and test pulses.

An improved transversal filter has thus been described as well as a circuit for utilizing this filter as an automatic equalizer. While this invention has been particularly shown and described with reference to a preferred embodiment thereof it will be understood by those skilled in the art that the foregoing and other changes in form and details may be made therein without departing from the spirit and scope of the invention.

We claim:

1. A transversal filter comprising:
   - means for applying to said filter a input signal, an analogue value of which varies with time;
   - means for encoding said analogue value into a binary pulse train;
   - a delay line with taps at discrete intervals;
   - means for applying said binary pulse train to be passed through said delay line;
   - a plurality of storage means, each of said storage means storing a predetermined value;
   - summing means;
   - means for utilizing the outputs from at least selected ones of said delay line taps to gate the values stored in said storage means to said summing means; and
   - means for utilizing the output from said summing means as the transversal filter output.

2. A filter of the type described in claim 1 wherein said transverse filter output means includes means for converting the output from said summing means into a smooth waveform.

3. A filter of the type described in claim 2 wherein said means for converting the output from the summing means into a smooth waveform is a low pass filter.

4. A filter of the type described in claim 1 wherein:
   - said delay line is a multiposition shift register; and
   - including clock means for stepping said shift register at exactly the same rate as that at which the pulses of said binary pulse train are applied thereto.

5. A filter of the type described in claim 4 wherein the rate at which said clock means applies stepping inputs to said shift register may be varied.

6. A filter of the type described in claim 1, wherein:
   - said analogue value is the input signal amplitude; and
   - said encoding means includes means for converting said amplitude into a pulse train the pulse density of which is proportional to said amplitude.

7. A filter of the type described in claim 6 wherein said converting means is a delta-sigma modulator.

8. A filter of the type described in claim 4 wherein:
   - said analogue value is the amplitude of the input signal;
   - said encoding means includes means for converting said amplitude into a pulse train the pulse density of which is proportional to said amplitude; and
   - said clock means controls both the generation of pulses by said converting means and the shifting of pulses through said shift register.

9. A system of the type described in claim 1 including means for setting said predetermined values into said storage means.

10. An automatic equalizer comprising:
    - means for applying to said equalizer input signal on which equalization is desired, an analogue value of said input signal varying with time;
    - means for encoding said analogue value into a binary pulse train;
    - a delay line with taps at discrete intervals;
    - means for applying said binary pulse train to be passed through said delay line;
    - a plurality of storage means each of said storage means storing a predetermined value which is to be utilized in weighting said input signal for equalization;
    - summing means;
    - means for utilizing the outputs from at least selected ones of said delay line taps to gate the weighting values stored in said storage means to said summing means; and
    - means for utilizing the output from said summing means as the equalized output signal.

11. An equalizer of the type described in claim 10 wherein the output from said summing means is a multivalue pulse train; and wherein said summing means utilizing means includes means for converting said multivalue pulse train into a smooth waveform.

12. An equalizer of the type described in claim 10 wherein:
    - said delay line is a multiposition shift register; and
    - including clock means for stepping said shift register at exactly the same rate as that at which the pulses of said binary pulse train are applied thereto.

13. An equalizer of the type described in claim 12 wherein the rate at which said clock means applies stepping inputs to said shift register may be varied in accordance with variations in the clock rate of said synchronous input signal.

14. An equalizer of the type described in claim 10 wherein said encoding means is a delta-sigma modulator.

15. An equalizer of the type described in claim 10 wherein:
    - all of said delay line taps, except the center tap of said delay line, are utilized to gate weighting values stored in corresponding storage means to said summing means; and
    - the bit at said center tap is assigned a weight of unity.

16. An equalizer of the type described in claim 10 including means for setting said predetermined values into said storage means.

17. An equalizer of the type described in claim 16 wherein:
    - said input signal applying means includes means for applying a predetermined test signal to said equalizer; and
    - said predetermined values setting means includes means for comparing the output from said equalizer at selected intervals after said test signal is applied to said equalizer against a desired reference, and means for utilizing the error output from said comparing means at each of said intervals to, depending on the polarity of the error, increment or decrement the value in a selected one of said storage means.

18. An equalizer of the type described in claim 17 including means for inhibiting further change in the values stored in said storage means.

19. An equalizer of the type described in claim 17 wherein: said storage means are forward-reverse counters; and said error output utilizing means includes means for storing each of said error polarities, and means operative when said test signal has passed completely through said delay line for applying the stored error values to increment or decrement said forward-reverse counters.

20. An equalizer of the type described in claim 10 including means for controlling the amplitude of the equalizer output.